(12) United States Patent
Aizawa et al.

(10) Patent No.: US 11,029,208 B2
(45) Date of Patent: Jun. 8, 2021

(54) MICROSPECTROSCOPE HAVING AUTOMATIC SAMPLE DETECTION FUNCTION

(71) Applicant: JASCO Corporation, Tokyo (JP)

(72) Inventors: Kento Aizawa, Tokyo (JP); Yoshiko Kubo, Tokyo (JP); Norihito Fujiwara, Tokyo (JP); Katsunori Morii, Tokyo (JP)

(73) Assignee: JASCO Corporation, Tokyo (JP)

( * ) Notice: Subject to any disclaimer, the term of this patent is extended or adjusted under 35 U.S.C. 154(b) by 0 days.

(21) Appl. No.: 16/783,294

(22) Filed: Feb. 6, 2020

(65) Prior Publication Data

US 2020/0271522 A1 Aug. 27, 2020

(30) Foreign Application Priority Data

Feb. 15, 2019 (JP) ............................... JP2019-25324

(51) Int. Cl.
| | |
|---|---|
| *G01J 3/02* | (2006.01) |
| *G01J 3/44* | (2006.01) |
| *G01J 3/28* | (2006.01) |
| *G01N 21/65* | (2006.01) |

(52) U.S. Cl.
CPC .............. *G01J 3/44* (2013.01); *G01J 3/0256* (2013.01); *G01J 3/2823* (2013.01); *G01N 21/65* (2013.01)

(58) Field of Classification Search
CPC .. G01J 3/44; G01J 3/2823; G01J 3/02; G01N 21/65; G06T 2207/20221; G06T 2207/10056; G06T 5/50; G02B 21/06; G02B 21/36
See application file for complete search history.

(56) References Cited

U.S. PATENT DOCUMENTS

2017/0184833 A1* 6/2017 Okamoto ............. G02B 21/244

FOREIGN PATENT DOCUMENTS

JP 2007-292704 A 11/2007

* cited by examiner

*Primary Examiner* — Abdullahi Nur
(74) *Attorney, Agent, or Firm* — Rankin, Hill & Clark LLP

(57) ABSTRACT

The present invention relates to improvement in accuracy of an automatic sample detection technique in spectrometry of a microspectroscope.
A microspectroscope 10 comprises: a light source 12 that emits an excitation light to a sample 20; a condensing lens 16 that emits the excitation light to a predetermined position of the sample 20 and condenses a reflected light or a transmitted light from the sample 20; a spectrometer 24 that detects a condensed light; and an analysis control unit 30 for analyzing a signal from the spectrometer 24; the microspectroscope 10 that uses an observation image of the sample 20 to perform spectrometry, wherein
  the analysis control unit 30 comprises: an image storage part 32 that converts the observation image to an all-in-focus image to store the all-in-focus image; and a control part 34 that makes the microspectroscope 10 to perform measurement,
  the image storage part 32 adds a detected information of a sample point that is a target of spectrometry to the all-in-focus image to create a sample search image data, and
  the control part 34 automatically detects the sample point by using the sample search image data.

16 Claims, 15 Drawing Sheets obtain image while scanning Stage Z without sharpening processing    sharpening processing : small (3 × 3)

(a) (b)

MICROSPECTROSCOPE HAVING AUTOMATIC SAMPLE DETECTION FUNCTION

FIELD OF THE INVENTION

The present invention relates to a microspectroscope, and particularly to improvement in accuracy of an automatic sample detection technique in spectrometry of a microcpectroscope.

BACKGROUND OF THE INVENTION

Conventionally, spectrometry is widely known as a means for identifying a substance contained in a sample. In Raman spectrometry, for example, a Raman scattering light generated by an excitation light from a sample is detected to identify a substance contained in a sample based on a difference of frequency between the excitation light and the Raman scattering light (Raman shift).

Usually, Raman spectrometry by a point measurement is performed when the position of the measurement target is clear, and the obtained spectral data is analyzed to identify the measurement target. However, when measuring an unknown sample or inspecting a foreign substance, it is a rare to know in advance which region of the sample the measurement target is positioned.

Patent Literature 1 discloses a technique for obtaining a spectrum of a foreign substance by Raman spectrometry by: photographing an image of an injection solvent (a liquid storing part of an inspection chip) by mapping; binarizing the photographed image by a computer; recording a two-dimensional coordinate of the center of gravity of the foreign substance; switching the objective lens in the microscopic Raman spectrometer to a high-magnification objective lens; and moving the stage to a coordinate position where the foreign substance exists. That is, Patent Literature 1 discloses a technique capable of automatically measuring a foreign substance in spectrometry. Patent Literature 1 further discloses a technique of identifying a foreign substance by a three-dimensional image created by performing a mapping measurement in a depth direction.

CITATION LIST

Patent Literature

PATENT LITERATURE 1: Japanese Unexamined Patent Publication No. 2007-292704 A

DISCLOSURE OF THE INVENTION

Problem to be Solved by the Invention

As in Patent Literature 1, when the photographed image subjected to a predetermined processing such as binarization processing or the like is used, the coordinate position of the foreign substance in the sample (injection solvent in Patent Literature 1) can be identified and the foreign substance can be automatically detected to obtain a spectrum; however, a deviation of the focal point always occurs in an actual photographed image, and as a result, it may lead to misdetection depending on the kind of a foreign substance.

Moreover, Patent Literature 1 discloses that a mapping measurement in a depth direction is performed to create a three-dimensional image, and a foreign substance is identified by the three-dimensional image. In this method, automatic detection using information in the depth direction seems possible; however, it cannot be said that the deviation of the focal point is not solved in all the region of the photographed image, and it may be difficult to perform an accurate measurement due to a region with inaccurate depth information. Thus, there is still a room for improvement.

The present invention has been accomplished in view of the above-mentioned conventional art, and an object thereof is to accomplish a microspectroscope having an automatic sample detection function with less misdetection than before and capable of accurate spectrometry.

Means to Solve the Problem

In order to solve the above problem, a microspectroscope according to the present invention comprises:

a light source that emits an excitation light to a sample; a condensing lens that emits the excitation light to a predetermined position of the sample and condenses a reflected light or a transmitted light from the sample; a spectrometer that detects a condensed light; and an analysis control unit that analyzes a signal from the spectrometer, the microspectroscope that performs spectrometry by using an observation image of the sample, wherein:

the analysis control unit comprises an image storage part that converts the observation image to an all-in-focus image to store the same, and a control part that makes the microspectroscope to perform measurement, the image storage part adds a detected information of a sample point that is a target of spectrometry to the all-in-focus image to create a sample search image data, and the control part automatically detects the sample point by using the sample search image data.

In the microspectroscope according to the present invention, the sample search image data is added with any of a center of gravity, an area, a circularity, color, a Feret's diameter, and an angle of rotation of the sample point as the detected information to the sample search image by analyzing the all-in-focus image data.

In the microspectroscope according to the present invention, a height position information of the sample point in the sample is added as the detected information to the sample search image data.

In the microspectroscope according to the present invention, the image storage part performs a binarization processing to the all-in-focus image as a preliminary processing for creating the sample search image data.

In the microspectroscope according to the present invention, the control part uses the sample search image data to automatically detect the sample point by a template matching as a matching action of the image.

Effect of the Invention

According to the present invention, a microspectroscope having an automatic sample detection function with less misdetection than before and capable of accurate spectrometry can be provided by: adding a detected information of a sample point that is a target of spectrometry in a sample to an all-in-focus image obtained by converting an observation image to create a sample search image data, and using this sample search image data to automatically detect the sample point.

BEST MODE FOR CARRYING OUT THE INVENTION

Hereinbelow, the microspectroscope of the present invention is described with reference to the figures; however, the present invention is not limited to the examples given below unless the scope of the present invention is exceeded.

Figure 1:
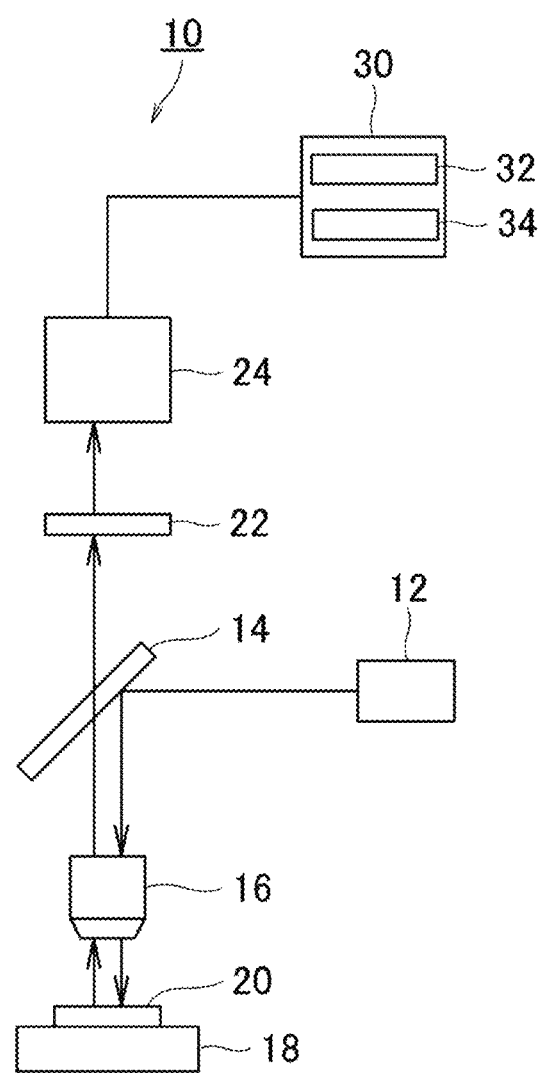
FIG. 1 is a schematic configuration of a Raman microspectroscope according to an embodiment of the present invention.

FIG. 1 shows a schematic configuration of a microspectroscope according to an embodiment of the present invention. The microspectroscope according to the present embodiment is a Raman microspectroscope. A Raman microspectroscope 10 shown in FIG. 1 comprises: a light source 12 that emits an excitation light to a sample 20; a beam splitter 14 that guides the excitation light towards the sample 20; an objective lens 16 that emits the excitation light to a predetermined position of the sample 20 and has a condensing lens function to condense a reflected light from the sample 20; a movable stage 18 where the sample 20 is placed onto; a filter 22 that eliminates a predetermined light that is unnecessary for measurement among the reflected light condensed from the sample 20; a spectrometer 24 that detects a Raman scattering light that passed through the filter 22; and a computer 30 as an analysis control unit connected to the spectrometer 24. The computer 30 comprises: an image storage part 32 that stores an observation image obtained by microscopic measurement; and a control part 32 that makes the Raman microspectroscope to perform measurement action.

First of all, a brief flow of Raman spectrometry is described. The excitation light emitted from the light source 12 is reflected by the beam splitter 12 toward the sample 20, and passes through the objective lens 16 to be emitted onto a predetermined position of the sample 20. The excitation light emitted from the sample 20 makes a light (Raman scattering light) that is different from the excitation light scatter from the sample 20.

The objective lens 16 takes in the Raman scattering light (the objective lens 16 also acts as a condensing lens), and then the Raman scattering light passes through the filter 22 to proceed towards the spectrometer 24. A rejection filter such as a notch filter or an edge filter, for example, can be employed as the filter 22 in the present embodiment.

The Raman scattering light detected by the spectrometer 24 is taken into the computer 30, and is subjected to a predetermined analysis as a spectral data in accordance with a purpose. The Raman spectrometry in the present embodiment is schematically performed in such way. The Raman microspectroscope 10 according to the present embodiment has a sample search function that can automatically detect a sample point in Raman spectrometry. Hereinbelow, the sample search function that is the characteristic feature of the present invention is described in detail.

<Sample Search Function>

Figure 2:
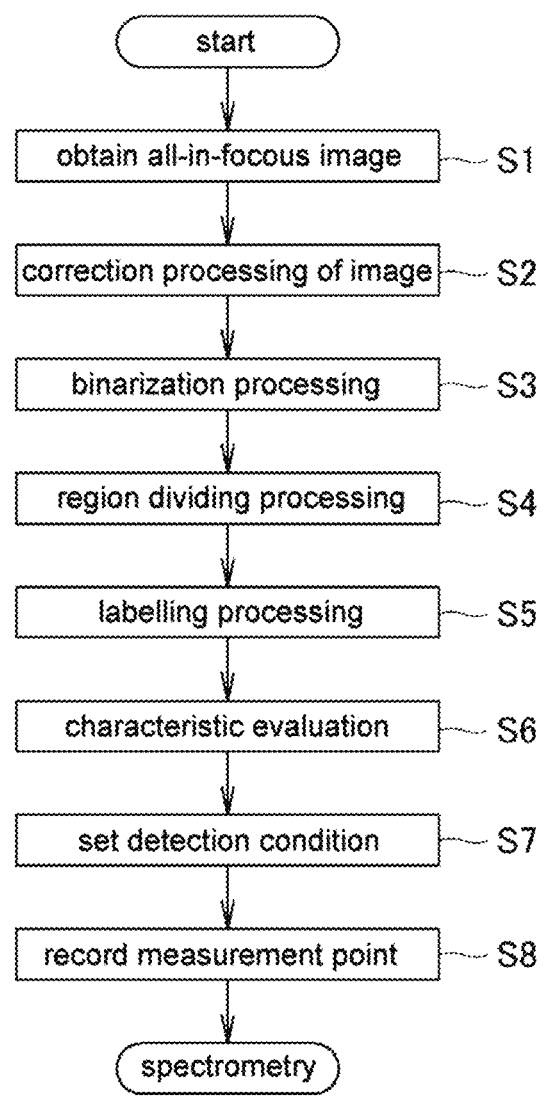
FIG. 2 is a flow chart of a sample search function in the Raman microspectroscope according to the present embodiment.

FIG. 2 shows a flow chart of the sample search function in the Raman microspectroscope according to the present embodiment. This flow chart shows each processing or step in a preliminary stage of Raman spectrometry performed by the Raman microspectroscope 10.

First of all, as shown in FIG. 2, an all-in-focus image of the sample 20 is obtained (S1). The all-in-focus image as used herein is an observation image of which all the region where microscopic measurement is performed by the Raman microspectroscope 10 is in focus, or an observation image of which a processing of some kind for making all region to be in focus is performed to.

Figure 3:
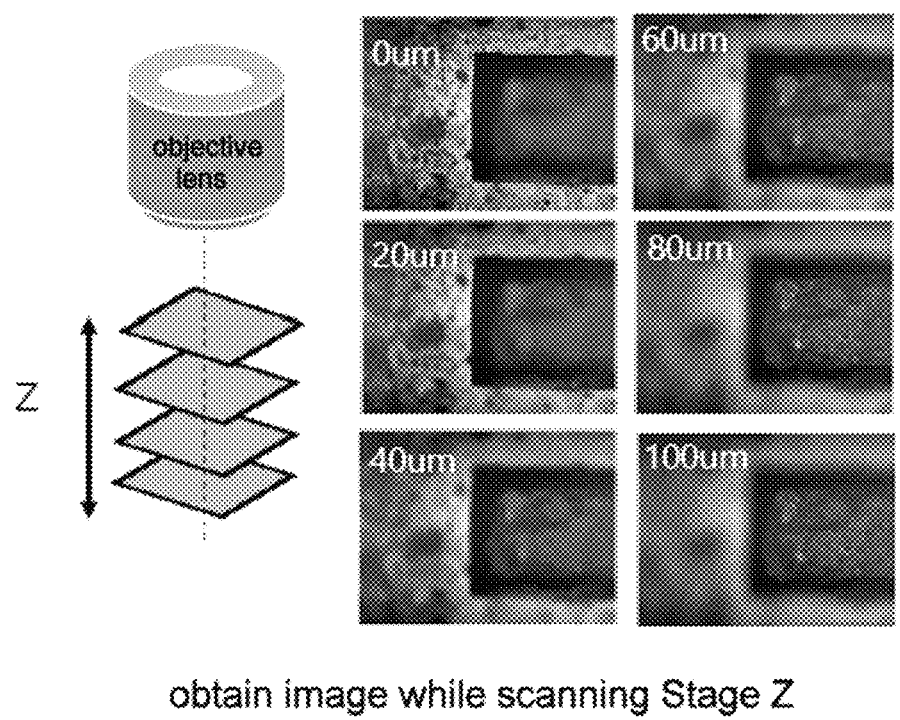
FIG. 3 is a schematic diagram of a method to obtain an all-in-focus image in the Raman microspectroscope according to the present embodiment.

As shown in FIG. 3, for example, a clear all-in-focus image without a blur can be obtained by synthesizing a plurality of images having different focal points. Moreover, upon obtaining the all-in-focus image, a height information of the sample 20 can be obtained simultaneously. Furthermore, the all-in-focus image in the present embodiment may be obtained by automatically focusing each point simultaneously with microscopic measurement; however, it can also be obtained by storing an observation image of which microscopic measurement is performed to in the image storage part 32 of FIG. 1, and performing a predetermined processing to process it into an all-in-focus image, for example.

Then, a correcting processing for making it to an image that can be easily used in the sample search is performed to the obtained all-in-focus image (S2). As an example of the correcting processing of the image, a shading processing, noise elimination, a sharpening processing or the like can be performed.

Figure 4:
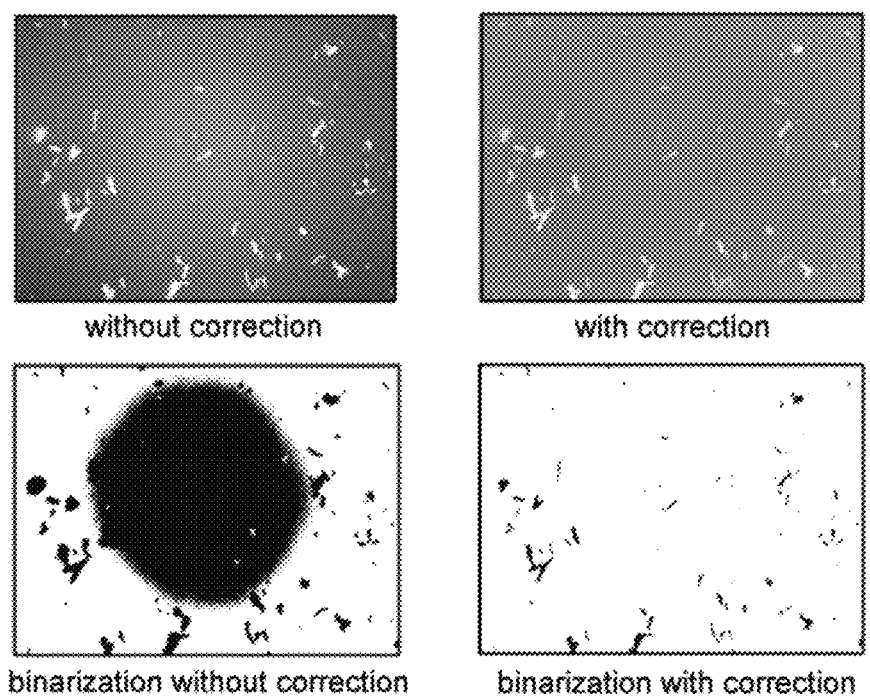
FIG. 4 is a schematic image diagram of a shading processing to the all-in-focus image in the present embodiment.
Figure 5:
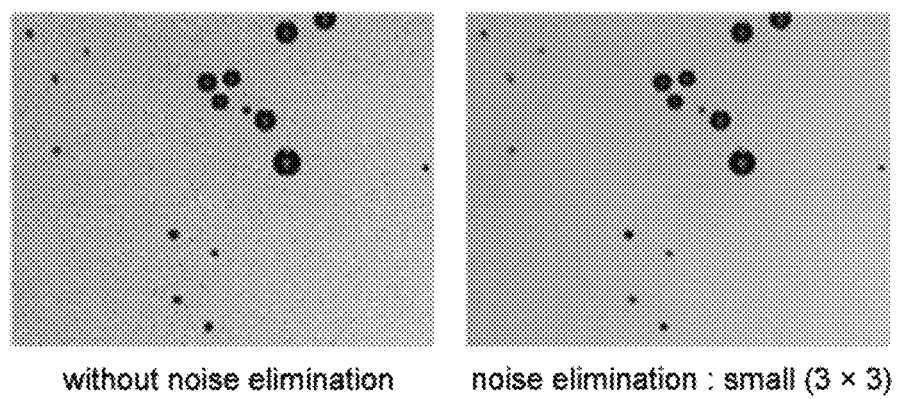
FIG. 5 is a schematic image diagram related to noise elimination to the all-in-focus image in the present embodiment.

As shown in FIG. 4, the shading processing is effective when detecting a sample point that is positioned in a region where a contrast to the background image is small in a binarization processing (S3 in FIG. 2) to follow (as in FIG. 4, it may be difficult to identify the sample point without correction of the shading processing).

Noise elimination can be performed with a median filter, for example. In median filtering, a surrounding area (e.g.

nine pixels of 3×3) of each pixel is compared, and a median value thereof is calculated to replace with the same. Since it has an effect of eliminating an outlier, it is particularly effective in eliminating a salt-and-pepper noise. The filter size used in the present embodiment is 3×3 (small), 5×5 (medium), and 7×7 (large); however, it is not limited to those values in particular.

Figure 6:
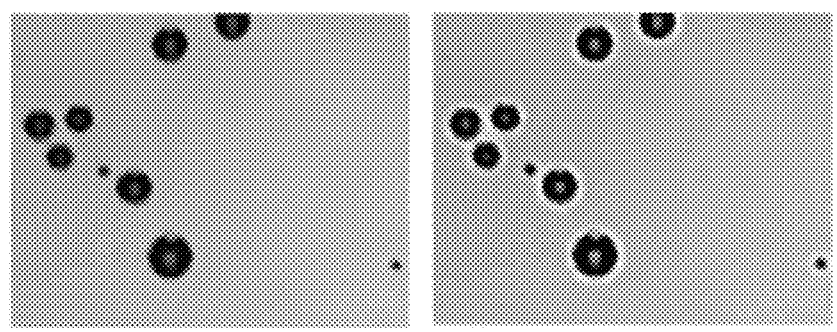
FIG. 6 is a schematic image diagram related to a sharpening processing to the all-in-focus image in the present embodiment.

As shown in FIG. 6, the sharpening processing has an effect of clarifying a contour between the background image and the sample point in the all-in-focus image. In the present embodiment, the effect of the sharpening processing is performed in a range of 3×3 (small), 5×5 (medium), and 7×7 (large); however, it is not limited to those values in particular.

Figure 7:
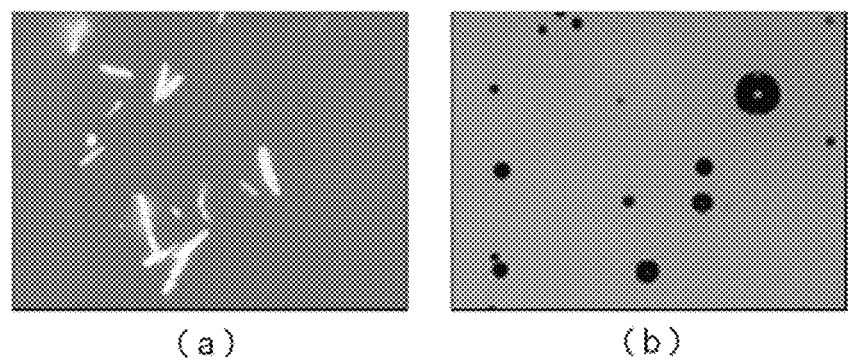
FIG. 7 is a schematic image diagram related to brightness of the sample point in a binarization processing of the present embodiment.

Next, a binarization processing is performed to the all-in-focus image of which the correction processing is performed to in S2 in the flow chart of FIG. 2 (S3). Before performing this binarization processing, the sample point to be detected is set whether it is brighter or darker compared with the background image. For example, when the sample point is brighter than the background image like in FIG. 7(*a*), "bright" is selected at a setting screen of the computer 30 (not shown in the drawings); and when the sample point is darker than the background image like in FIG. 7 (*b*), "dark" is selected. A user can perform the binarization processing by selecting from a manual binarization of which a threshold is set manually, an automatic binarization of which the threshold is set automatically, and an adaptive binarization.

Figure 8:
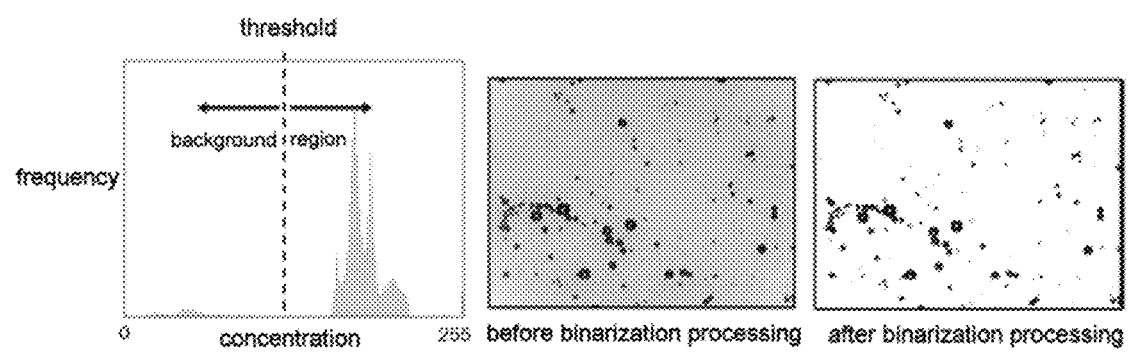
FIG. 8 is a schematic image diagram of a manual binarization processing in the present embodiment.

As shown in FIG. 8, the manual binarization is performed by manually setting a threshold to the all-in-focus image. When the luminance of each point is equal to or greater than the threshold, the point is regarded as a detection region and extracted, and the other points are regarded as a background image and displayed in black and white. The threshold may be set by operating a scrollbar displayed on a setting screen of the computer 30, or inputting a numerical value to a text box, for example.

The automatic binarization is a method of automatically determining the threshold with a discriminant analysis method. This discriminant analysis method is also called as Otsu's binarization, and can perform binarization automatically by calculating the threshold where a separation degree is the maximum, for example.

Figure 9:
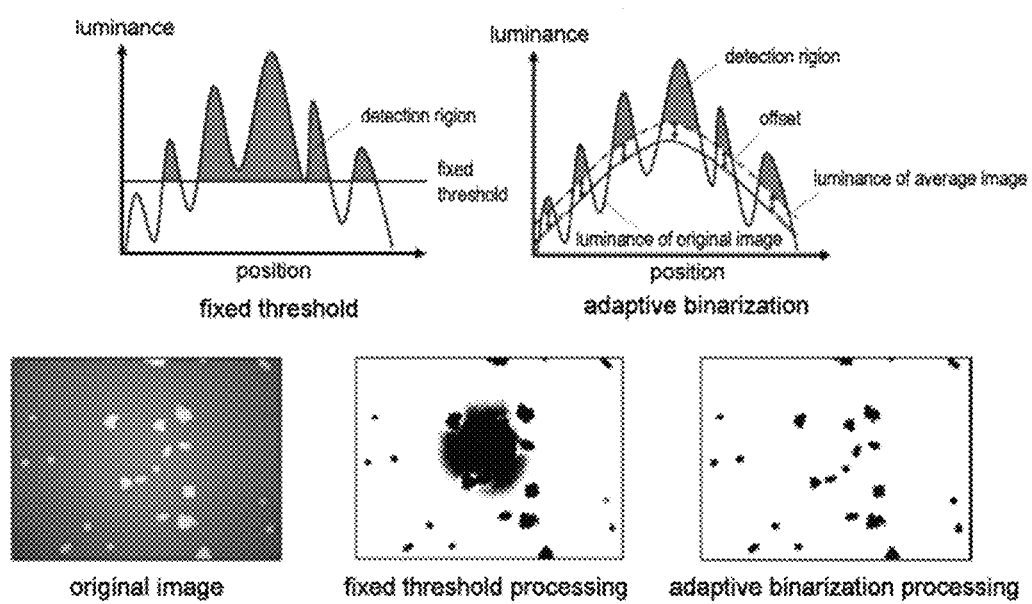
FIG. 9 is a schematic image diagram of an adapted binarization processing in the present embodiment.

As shown in FIG. 9, the adaptive binarization can set a region size (detection region) to be averaged and an offset value. If there is unevenness in the luminance, suitable binarization may not be performed when the threshold is fixed. Processing of this adaptive binarization is a method that can set the threshold by referring to the luminance in the vicinity without fixing the threshold for each pixel. In the present embodiment, the method of binarization can be selected in accordance with the sample point or measurement condition.

Figure 10:
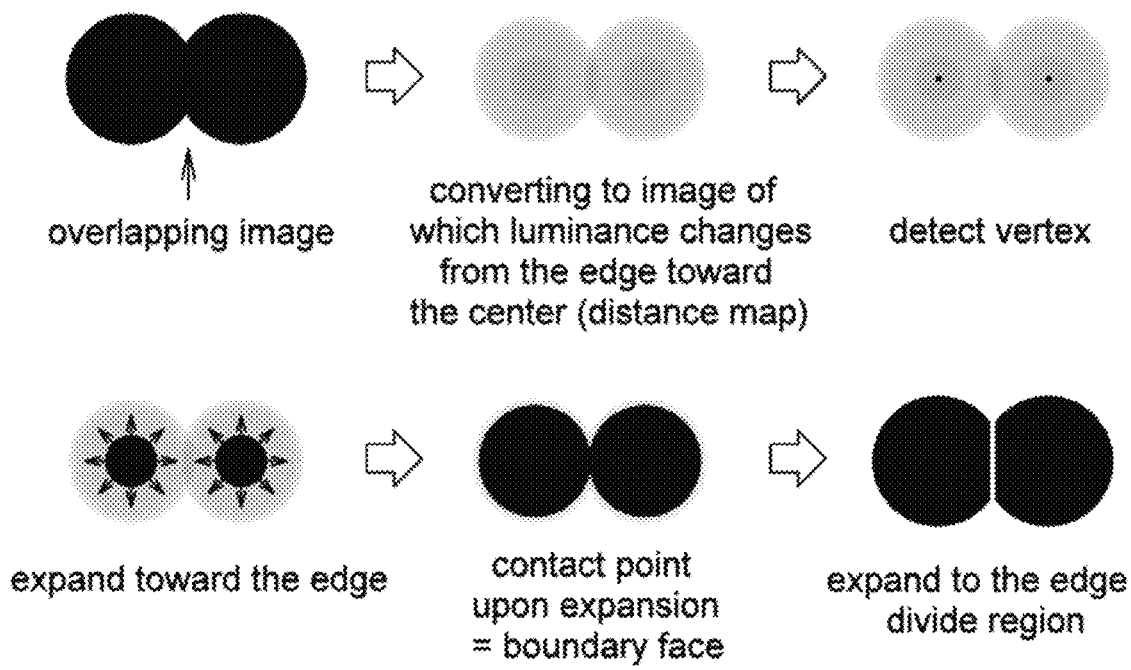
FIG. 10 is a schematic image diagram of a region dividing processing in the present embodiment.

Next, the region dividing processing (S4) is described. The region dividing processing (also called as a watershed processing) can be achieved by performing a predetermined processing to the binarized image in S3. As shown in FIG. 10, a distance map of which the luminance varies from the contour to the center of the sample point is created with the binarized image of the all-in-focus image. Detection of a vertex position is performed to this distance map. Then, an expansion processing is performed from each vertex position to the edge. A part where it overlaps upon expansion is recognized as a boundary face, so that the region can be devided suitably.

Next, a labelling processing (S5) is performed to the image that has been subjected to the processing of S2 to S4. The labelling processing is a processing to allot one numerical value to one region among a plurality of regions that are not connected in the binarization image in order to distinguish them. In the present embodiment, however, this processing does not need to be performed strictly, and it is sufficient if a processing similar to this labelling processing is performed, for example.

Figure 11:
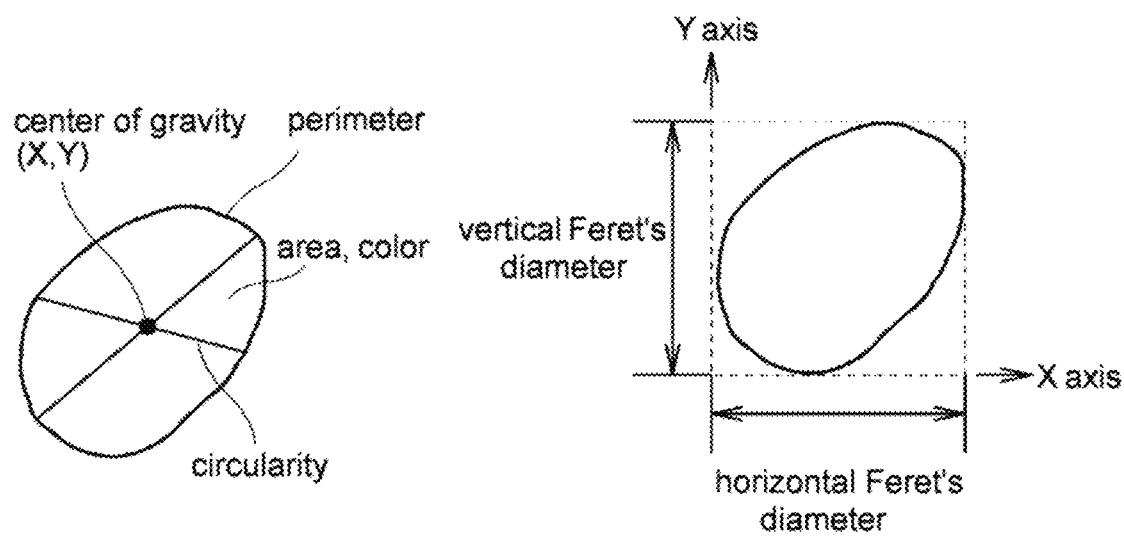
FIG. 11 is a schematic image diagram of characteristic evaluation of the sample point in the present embodiment.

Next, a characteristic evaluation of the sample point is performed in S6. Here, a search is performed to the binarized image that has been the processing of S2 to S5 to the all-in-focus image. As shown in FIG. 11, for example, a characteristic evaluation for a center of gravity, an area, color, a circularity, Feret's diameters in horizontal and vertical directions, and an angle of rotation (not shown in the drawings) is performed.

Moreover, since the present embodiment uses the all-in-focus image, a height position information of the sample point in the sample 20 can be added, for example. An image data added with the characteristic feature of the sample point by this processing of S6 is called as a sample search image data herein. In the evaluation of the center of gravity, for example, the center of gravity of the sample point is calculated, and this center of gravity is recorded as a coordinate to the sample search image data.

In the evaluation of the Feret's diameter in the present embodiment, the length of the side parallel to X-axis of the circumscribed rectangle is calculated as a horizontal Feret's diameter, and the length of the side parallel to the circumscribed rectangle is calculated as a vertical Feret's diameter. In the evaluation of the area, the area of the sample point is calculated. In the evaluation of the circularity, the circularity is calculated from the area and the perimeter (circularity= $4\pi \times \text{area} \div (\text{perimeter})^2$). In the evaluation of color, the color information of the sample point is obtained. The color information can be shown in accordance with RGB color code, for example (R: 0-255; G: 0-255, B: 0-255).

Next, setting of a detection condition (S7 of the flow chart) is described. In S7, a measurement condition of spectrometry is set to the sample search image data. This measurement condition can be set as necessary from the size, the area, the circularity, the Feret's diameter, the angle of rotation and the like of the sample point. Then, a measurement point is recorded based on the set measurement condition (S8), and the Raman microspectroscope 10 performs Raman spectrometry for the recorded measurement point.

As described above, after obtaining the sample search image data by performing the processing (S2 to S6) to the obtained all-in-focus image (in S1), the measurement point is recorded based on the set detection condition (S7, S8), so that a sample search (automatic detection of the sample point) with less misdetection and satisfactory accuracy can be achieved in the present embodiment.

<Template Matching>

As described above, the Raman microspectroscope 10 according to the present embodiment performs a sample search with an all-in-focus image (sample search image data). Specifically, a sample search by a template matching (matching action of the image) is performed for the measurement point recorded in S8 of the flow chart in the present embodiment. The template matching as used herein is a technique of extracting shapes or identifying sample points by overlapping the all-in-focus image (sample search image data) and the image obtained by the following spectrometry, for example.

Figure 12:
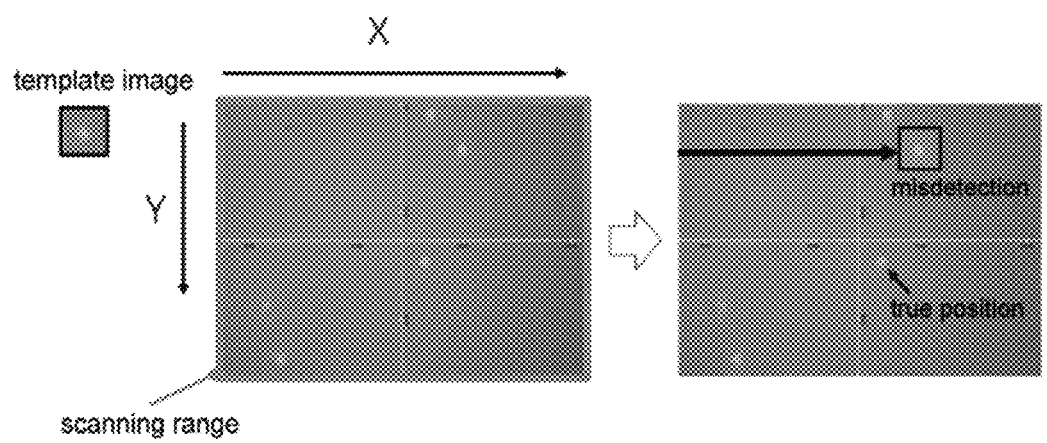
FIG. 12 is a schematic image diagram of a general template matching processing (matching processing of an image).

FIG. 12 shows a schematic image of a general template matching processing. When a scanning range of the template matching (matching action of the image) is enlarged with respect to the template image as shown in the top left side of FIG. 12, the position of the image similar to the sample point may be misdetected (in actual sample search, there are many similar shapes).

Figure 13:
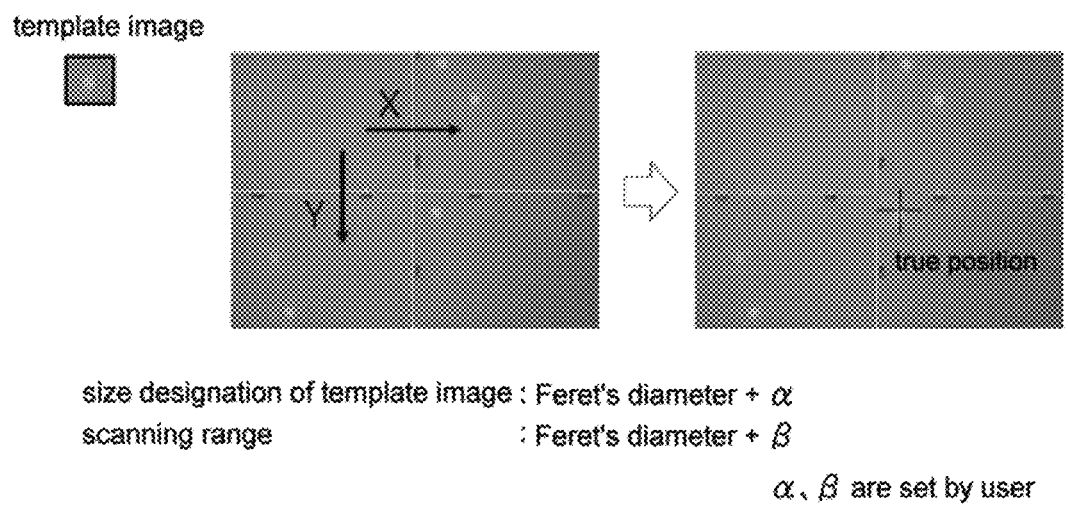
FIG. 13 is a schematic diagram of a sample search by the template matching processing in the present embodiment.

Accordingly, in the present embodiment, misdetection can be reduced by performing the template matching with a smaller scanning range as shown in FIG. 13. Specifically, the template image and the scanning range can be set individually to ranges larger than the Feret's diameter of the sample point to a certain extent.

For example, the Feret's diameter of the sample point+α can be designated as the size of the template image, and the Feret's diameter+β can be designated as the scanning range (α, β are set by the user). Accordingly, by limiting the template image size and the scanning range, a sample search with less misdetection and satisfactory accuracy can be achieved.

Figure 14:
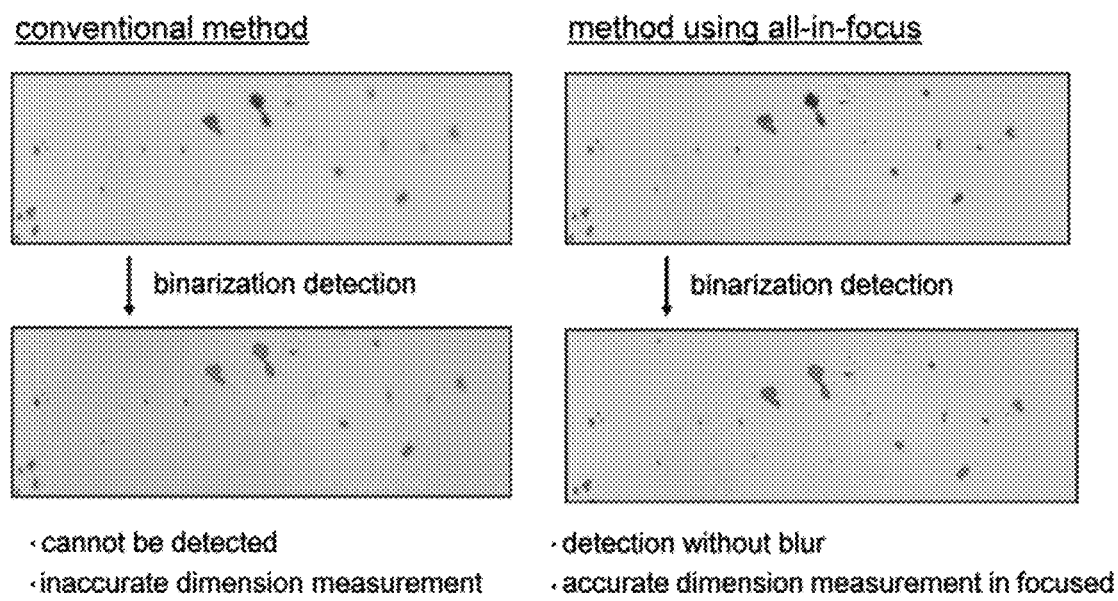
FIG. 14 is a schematic diagram of a sample search by a binary detection in the present embodiment.

Moreover, in the present embodiment, the focal point is in a focused state in all region by using the all-in-focus image, so that the accurate sample point can be detected. FIG. 14 shows that, in a conventional method (a case when an all-in-focus image is not used), it is likely that the sample point cannot be detected or may result in an inaccurate dimension measurement when a template matching (sample search) by a binarization detection is performed. Thus, by performing the sample search with the all-in-focus image like in the present embodiment, accurate detection and dimension measurement of the sample point can be achieved.

Figure 15:
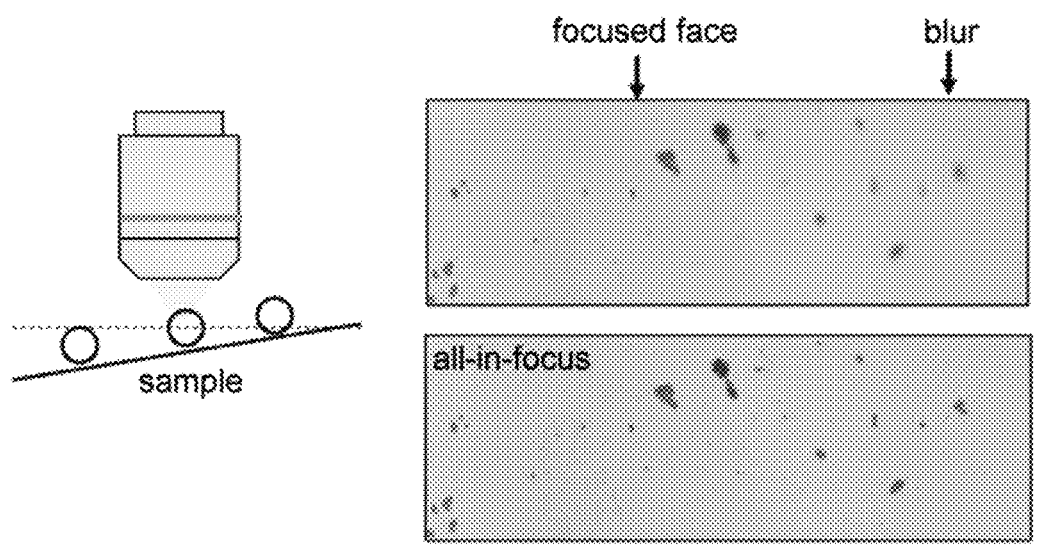
FIG. 15 shows an effect caused by an inclination of the sample in the present embodiment.

Furthermore, in a conventional manner, when the sample is inclined as shown in FIG. 15 (for example, when the sample 20 placed on the movable stage 18 is inclined in FIG. 1), the photographed image may be blurred and the characteristic feature of the sample may not be extracted, and as a result, a template matching may not be performed accurately. On the other hand, by using an all-in-focus image like in the present embodiment, the sample search can be performed in a state that the height position information of the sample is obtained, so that the sample point can be detected accurately.

As described above, in the Raman microspectrocope 10 according to the present invention, the observation image is converted at the image storage part 32 of the computer 30, and the detection information of the sample point is added to the obtained all-in-focus image to create the sample search image data. With this sample search image data, the Raman microscpectroscope 10 having the sample search function capable of spectrometry with less misdetection and excellent accuracy can be accomplished.

Furthermore, Raman spectrometry is described in the present embodiment, however, the present invention can achieve a similar effect not only in Raman spectrometry but also in other spectrometry, too. By performing a sample search with a sample search image data similar to the present embodiment in an infrared spectrometry or UV visible spectrometry, for example, a sample search with less misdetection and excellent accuracy than before can be achieved.

DESCRIPTION OF REFERENCE SIGNS

10 Raman microscpectroscope
12 Light source
14 Beam splitter
16 Objective lens (condensing lens)
18 Movable stage
20 Sample
22 Filter
24 Spectrometer
30 Computer
32 Image storage part
34 Control part

What is claimed is:

1. A microspectroscope comprising:
a light source that emits an excitation light to a sample; a condensing lens that emits the excitation light to a predetermined position of the sample and condenses a reflected light or a transmitted light from the sample; a spectrometer that detects a condensed light; and an analysis control unit that analyzes a signal from the spectrometer, the microspectroscope that performs spectrometry by using an observation image of the sample,
wherein:
the analysis control unit comprises an image storage part that converts the observation image to an all-in-focus image to store the same, and a control part that makes the microspectroscope to perform measurement,
the image storage part adds a detected information of a sample point that is a target of spectrometry to the all-in-focus image to create a sample search image data, and
the control part automatically detects the sample point by using the sample search image data.

2. The microspectroscope according to claim 1, wherein the sample search image data is added with any of a center of gravity, an area, a circularity, color, a Feret's diameter, and an angle of rotation of the sample point as the detected information to the sample search image by analyzing the all-in-focus image data.

3. The microspectroscope according to claim 1 or 2, wherein
a height position information of the sample point in the sample is added as the detected information to the sample search image data.

4. The microspectroscope according to claim 1, wherein the image storage part performs a binarization processing to the all-in-focus image as a preliminary processing for creating the sample search image data.

5. The microspectroscope according to claim 1, wherein the control part uses the sample search image data to automatically detect the sample point by a template matching as a matching action of the image.

6. The microspectroscope according to claim 2, wherein a height position information of the sample point in the sample is added as the detected information to the sample search image data.

7. The microspectroscope according to claim 2, wherein the image storage part performs a binarization processing to the all-in-focus image as a preliminary processing for creating the sample search image data.

8. The microspectroscope according to claim 3, wherein the image storage part performs a binarization processing to the all-in-focus image as a preliminary processing for creating the sample search image data.

9. The microspectroscope according to claim 6, wherein the image storage part performs a binarization processing to the all-in-focus image as a preliminary processing for creating the sample search image data.

10. The microspectroscope according to claim 2, wherein the control part uses the sample search image data to automatically detect the sample point by a template matching as a matching action of the image.

11. The microspectroscope according to claim 3, wherein the control part uses the sample search image data to automatically detect the sample point by a template matching as a matching action of the image.

12. The microspectroscope according to claim 4, wherein the control part uses the sample search image data to automatically detect the sample point by a template matching as a matching action of the image.

13. The microspectroscope according to claim 6, wherein the control part uses the sample search image data to automatically detect the sample point by a template matching as a matching action of the image.

14. The microspectroscope according to claim 7, wherein the control part uses the sample search image data to automatically detect the sample point by a template matching as a matching action of the image.

15. The microspectroscope according to claim 8, wherein the control part uses the sample search image data to automatically detect the sample point by a template matching as a matching action of the image.

16. The microspectroscope according to claim 9, wherein the control part uses the sample search image data to automatically detect the sample point by a template matching as a matching action of the image.

* * * * *